March 4, 1958 L. A. AMTSBERG 2,825,436
IMPACT CLUTCH
Filed July 3, 1953 3 Sheets-Sheet 1
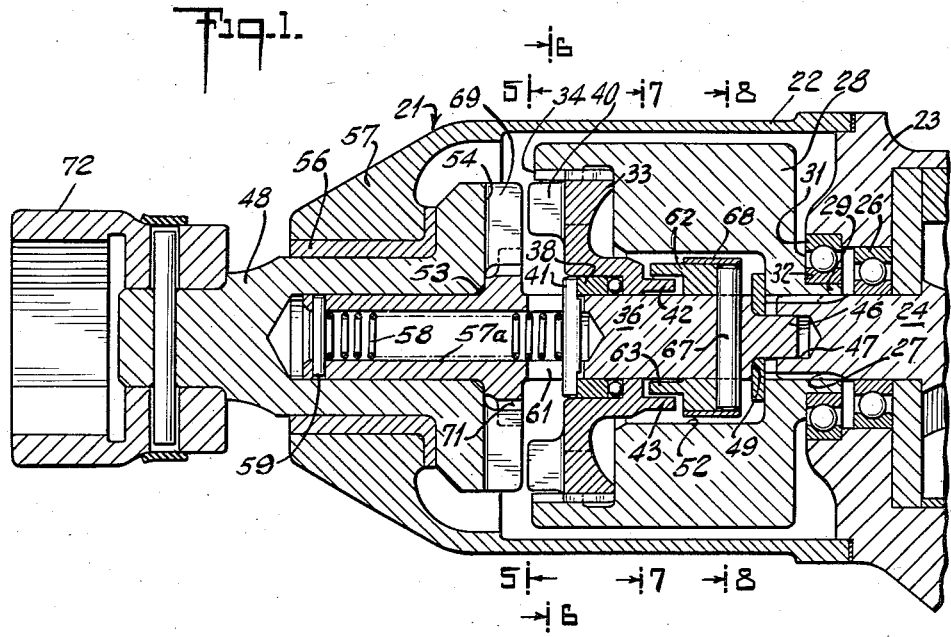
Fig.1.
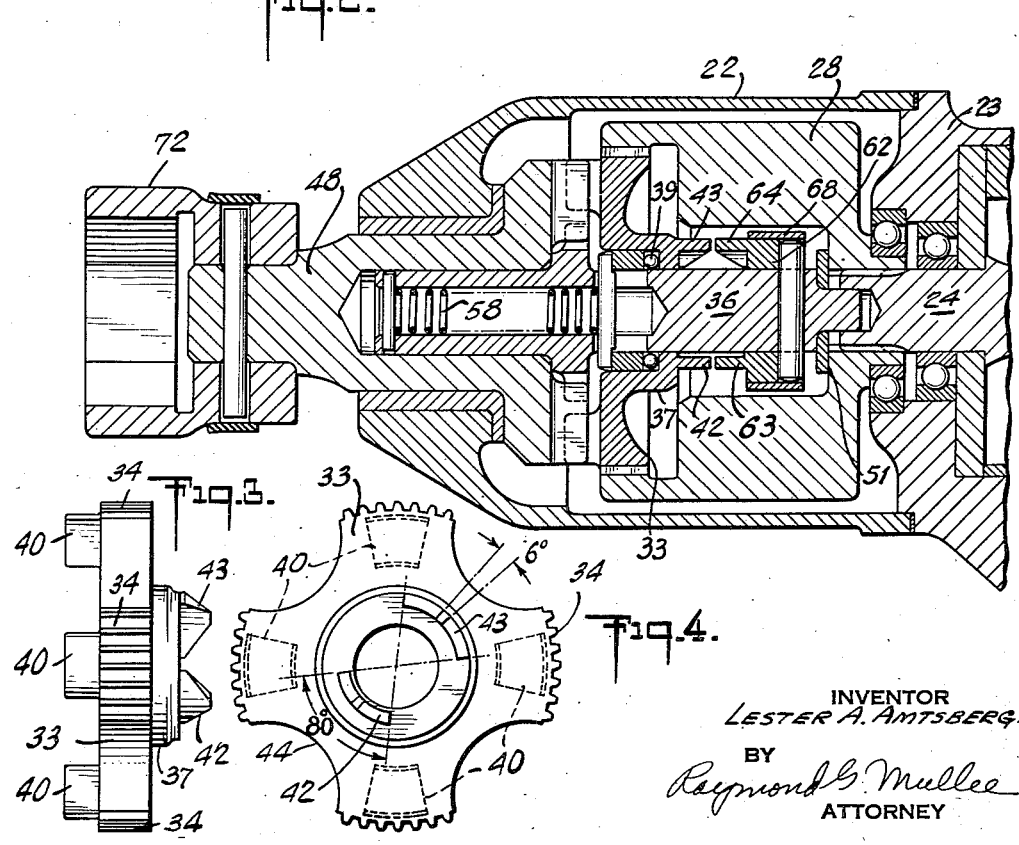
Fig.2.
Fig.3. Fig.4.
INVENTOR
LESTER A. AMTSBERG.
BY
Raymond G. Mullee
ATTORNEY March 4, 1958   L. A. AMTSBERG   2,825,436
IMPACT CLUTCH Filed July 3, 1953   3 Sheets-Sheet 2

INVENTOR
LESTER A. AMTSBERG.
BY
Raymond G. Mullee
ATTORNEY

March 4, 1958 L. A. AMTSBERG 2,825,436
IMPACT CLUTCH
Filed July 3, 1953 3 Sheets-Sheet 3
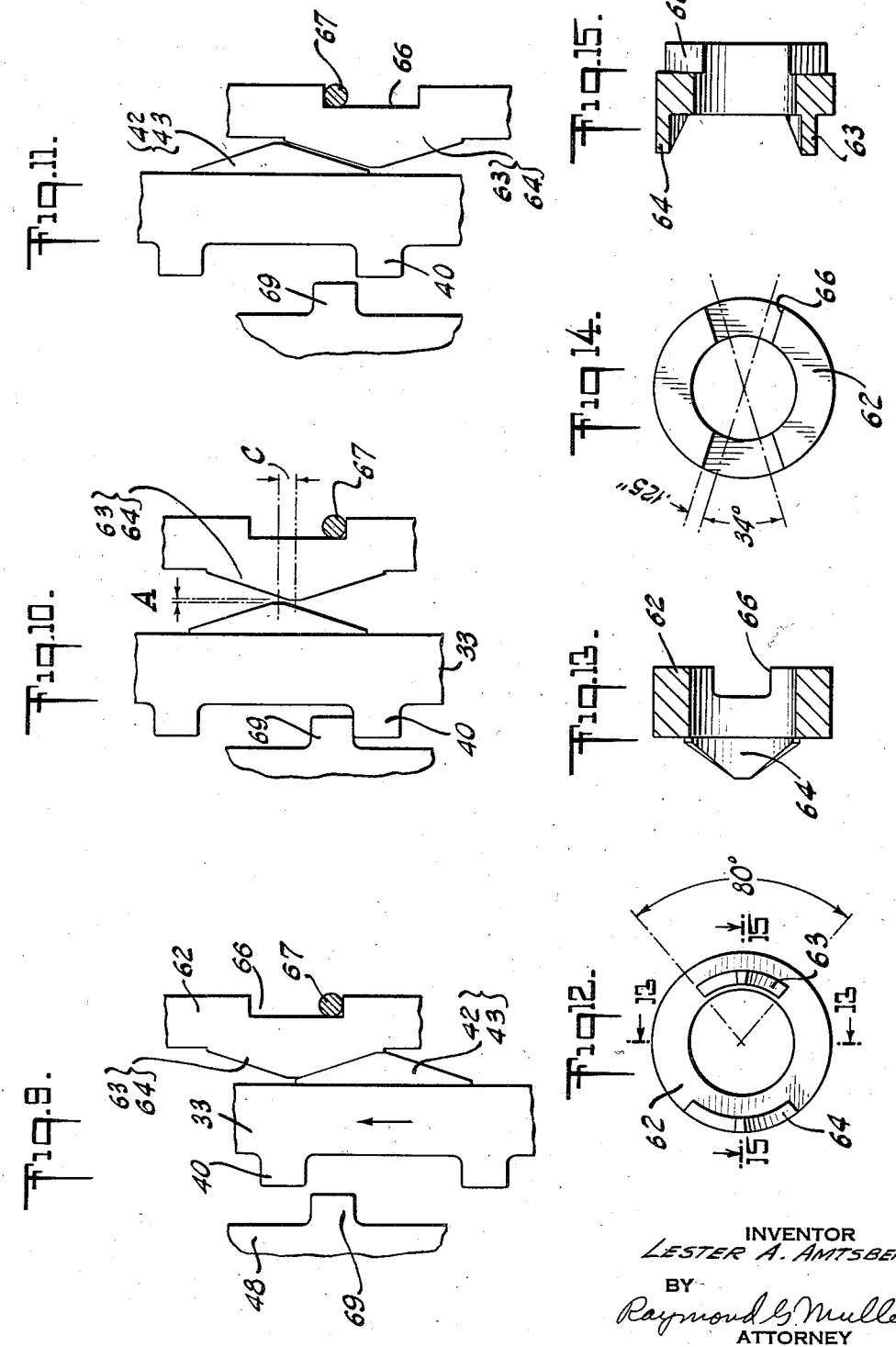
INVENTOR
LESTER A. AMTSBERG.
BY
Raymond G. Mullee
ATTORNEY United States Patent Office
2,825,436
Patented Mar. 4, 1958

2,825,436

IMPACT CLUTCH

Lester A. Amtsberg, Utica, N. Y., assignor to Chicago Pneumatic Tool Company, New York, N. Y., a corporation of New Jersey Application July 3, 1953, Serial No. 365,796

18 Claims. (Cl. 192—30.5)

This invention relates to impact clutches of the type which are adapted to automatically provide a succession of rotary impact blows to a driven member, such as a nut or bolt, for setting or unsetting operations thereon.

The impact clutch in the illustrative embodiment of the invention includes a cylindrical hammer element which is directly connected to a rotary power means. A dog member, slidably mounted within the hammer element by means of a spline connection, has a cam surfaced hub on its rear end, and a plurality of impact jaws on the forward end. The dog member cam surfaces are arranged to engage like cam surfaces of a cam element mounted upon a spindle which is directly connected to an anvil member. The anvil member is adapted at its forward end for affixation of a socket for engaging a driven member, i. e., nut or bolt, and has at the rear end a surface from which project a plurality of impact jaws, of like number to those on the dog member. Compression spring means within the spindle is adapted to constantly urge the dog member away from the anvil member. When resistance to rotation of the driven member reaches a predetermined value, the cam surfaces of the dog member, due to engagement with the cam surfaces of cam element, cause the dog member to slide forwardly within the hammer element so that the impact jaws thereof engage the impact jaws of the anvil member, resulting in an impact blow being transmitted to the driven member. The cam surfaces of the dog member and the cam element respectively, are arranged to provide a single impact blow during one complete revolution of the hammer element, however, more than one blow per revolution may be achieved by proper cam design, if such is desired. After each impact blow the compression spring means moves the dog member so that the impact jaws thereof are clear of the impact jaws of the anvil member.

The impact clutch of the invention will be found to be very efficient in operation, because of the small amount of energy required to engage the relatively light dog member. Furthermore, the force of each impact blow being simultaneously distributed over a plurality of impact jaws, results in minimum wear and long life of the working parts of the clutch.

The object of the invention is to provide an impact clutch which utilizes a cam arrangement for impact jaw clutching, and compression means for declutching.

Another object is to provide an impact clutch which has a plurality of impact jaws over which each impact blow is simultaneously distributed, and means for automatically separating and maintaining the jaws out of engagement while each driving jaw passes by a predetermined number of non-mating anvil jaws.

A further object is to provide an impact clutch which will provide a predetermined number of blows for each complete revolution of a rotary hammer element with the jaws properly aligned at each blow.

Another object is to provide an impact clutch which is very efficient in operation, has minimum wear on the working parts, and which is simple in structure and easy to maintain.

These and further objects of the invention will become more apparent from a study of the following disclosure and the attached drawings, in which:

Fig. 1 is a longitudinal section view of a representative embodiment of the invention showing the impact clutch in non-impacting position;

Fig. 2 is a view similar to that of Fig. 1 but showing the impact clutch in impacting position;

Fig. 3 is a side elevational view of a dog member as used in the invention;

Fig. 4 is an elevational view of the rear face of the dog member;

Fig. 9 is a fragmentary view, in development of the camming surfaces and impact jaws on both the hammer dog and the driven cam, and illustrating the relative position of the parts at the start of cam engaging action;

Fig. 10 is a development similar to Fig. 9, but showing the relative position of the parts at point of jaw impact;

Fig. 11 is a development similar to Fig. 9, but showing the relative position of the parts at the end of impact jaw disengaging action;

Fig. 12 is a front end view of the driven cam element;

Fig. 13 is a section view as seen from line 13 in Fig. 12;

Fig. 14 is a rear end view of the cam element; and

Fig. 15 is a section view as seen from line 15 in Fig. 12.

Figure 5:
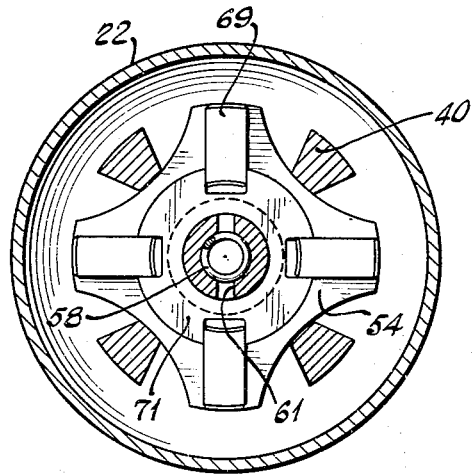
Figs. 5, 6, 7 and 8 are sectional views as seen from lines 5 to 8 respectively in Fig. 1.

In accordance with a feature of this invention a hammer jaw is arranged, upon release following delivery of an impact blow, to pass over not only the associated driven jaw, but the three jaws which follow, before the hammer jaw is moved axially into re-engagement with the associated driven jaw.

Referring now to Fig. 1, numeral 21 indicates an impact clutch assembly enclosed within a housing 22, which is affixed by bolt means, or equivalent (not shown), to the housing 23 of a motor, preferably of the pneumatic type, a portion thereof being shown. Protruding forwardly from the motor housing 23, is the end of a motor shaft 24, which is rotatably supported at one end within the motor by a ball bearing means 26. Upon the front end of shaft 24, and coupled thereto by a spline engagement 27, is a hammer element 28, which is cylindrical in form, and which has a hub portion 29 at the rearward end. Hub portion 29 is snugly fitted in a ball bearing 31, which is mounted within the end of motor housing 23, and concentric with bearing 26. Adjacent the hub portion 29 is a shoulder 32 which abuts the front surface of inner race member of the ball bearing 31, so that any axial movement of the hammer 28 in the direction of motor housing 23, is restricted.

Figure 6:
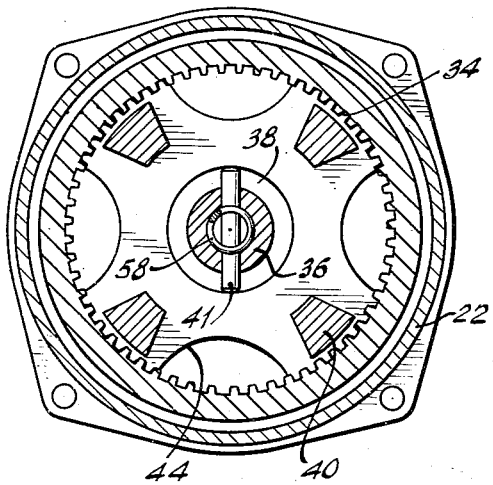
Figure 7:
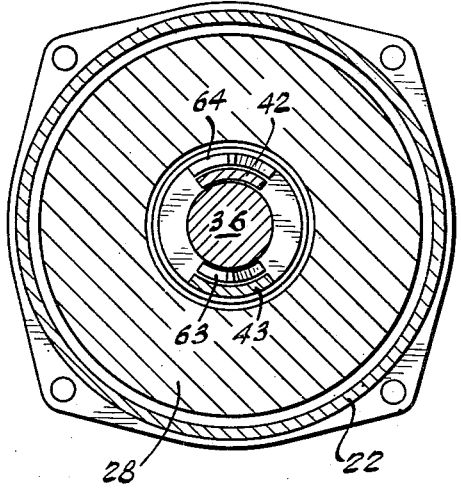

The forward end of hammer 28 is recessed to receive a dog member 33, which is connected for axial movement within the hammer 28, by a spline connection 34. The dog 33 is mounted for rotary and axial movement upon a spindle 36, however, axial movement in the rearward direction is limited by abutment with the hammer, as shown. The inner portion of dog 33 has a hub 37, which is recessed to enclose a cylindrical ring 38 slidingly mounted between the spindle 36 and the interior of hub 37. Between the end of ring 38 and the bottom of the hub recess, is contained a full complement of balls 39 which transmit to the dog 33 an axial thrust load caused by abutment of a spring loaded pin 41 against the ring 38. On the forward face of the dog 33 are arranged four equi-spaced identically shaped impact jaws 40 (Fig. 6). Projecting from the rear end of dog hub 37 are two diametrically opposed circular cam surfaces, 42 and 43, of the same shape and size, however, cam 42 being arranged closer to the axis of the hub 37 than is cam 43. Equal portions 44 of the dog are removed to provide for a weight reduction in the dog.

Spindle 36 has a reduced diameter portion 46 at the rear end for mounting within a cylindrical recess 47 formed in the end of motor shaft 24, while at the opposite end the spindle is supported within an anvil member 48. A shoulder 49, adjacent the reduced diameter spindle portion 46, abuts a washer 51 mounted on the portion 46, said washer being in contact with the bottom of a recess 52 formed in the hammer 28. Such arrangement not only restricts axial movement of the spindle in the direction of the motor housing 23, but restricts axial movement of the hammer 28 forwardly on the spindle. Toward the other end of the spindle is arranged a shoulder 53 which abuts a rearward surface 54 of the anvil 48, the latter being rotatably supported within a bushing 56, mounted in a nose portion 57 of the housing 22. It will be seen that this arrangement restricts forward movement of the spindle 36 within the housing 22.

The end of the spindle 36 has a bore 57a arranged to receive a compression spring 58, the forward end of which abuts a pin 59 affixed to the spindle, the rearward end being in abutment with the pin 41. A slot 61 formed in the spindle allows for axial sliding movement of the pin 41, the protruding ends of which abut the ring 38, whereby the dog 33 is permitted to be moved axially upon the spindle against the compressive force of spring 58.

Figure 8:
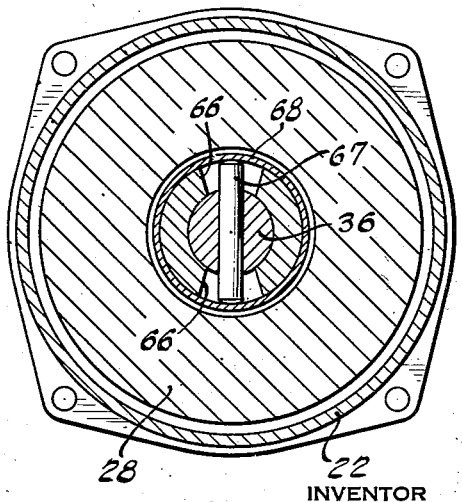

Mounted for limited rotation upon the spindle 36, and within the hammer recess 52, is a driven cam element 62, which has projecting from the forward end, two diametrically opposed circular cam projections 63 and 64, of the same shape and size, however, cam 63 being arranged closer to the axis of the cam element 62 than is cam 64. The cam projections 63 and 64, are of the same size and shape as the driving cams 42 and 43 of the dog hub 37. Due to the arrangement of pairs of cams at different radii, the driving cams will engage the driven cams once in each 360 degrees of relative rotation. On the rear side of the driven cam element 62 opposite cams 63 and 64, are arranged two radial slots 66 spaced 180° apart, which receive the end portions of a pin 67 mounted in the spindle 36. Referring to Fig. 8, the circumferential length of slots 66 is greater than the thickness of pin 67, to provide for slight lost motion of cam element 62 relative spindle 36. A cylindrical ring 68 arranged on the cam element 62, encloses the ends of pin 67. The arrangement of pin 67 allows a certain amount of rotary movement of the cam element 62 with respect the spindle, but restricts axial movement of the cam element toward the rear end of the spindle.

Projecting from the rear surface 54 of the anvil 48, are four equi-spaced identically shaped impact jaws 69, the heights of which are such as to clear the jaws 40 of the dog 33, when the latter is in full rearward, or non-impacting position (Fig. 1). Spindle 36 has a collar 71 which is notched at four places to snugly engage each of the four impact jaws 69, as best seen in Fig. 5. By such means the anvil 48 is rigidly associated with the spindle so that each rotates in connection with the other. The outer end of the anvil is adapted to receive a socket 72, which is used to engage the driven member i. e., nut, bolt, or screw driving bit to be operated upon.

Before considering the operation it should be kept in mind that the illustrative impact clutch comprises three basic components: 1, the driving elements consisting of motor shaft 24 and hammer 28 which rotate in unison, sometimes intermittently with a start-stop action, and without any axial movement; 2, the intermediate elements consisting of the rotatable and axially movable dog 33 and the cam element 62 driven thereby; and 3, the driven elements consisting of transverse pin 67, spindle 36, anvil 48 and socket 72, all held against axial movement, and being rotatable in unison with each other, sometimes at the same (continuous) speed as the driving elements and sometimes at a slower (intermittent) speed than the driving elements. The hammer element 28 and dog 33 form a hammer assembly in which the parts rotate in unison although the dog reciprocates relative to the hammer element 28.

In operation of the impact clutch, assume that the socket 72 has been placed on a nut to be set, and that the motor shaft 24 is turning full speed, and the parts of the clutch are in non-impacting position (Fig. 1), it will be seen that the hammer 28 will be rotated, thereby causing rotation of dog 33, due to the spline connection therewith. Rotation of the dog upon the spindle will cause cam surfaces 42 and 43 to engage cam surfaces 63 and 64 respectively (Fig. 9); thereupon causing partial rotation of cam element 62 upon the spindle. An edge of each of the slots 66 will shortly be brought into contact with the ends of pin 67, thereby causing the spindle 36 to rotate and turn the anvil 48, thus beginning the running-up operation on the nut to be set. It will be apparent from Fig. 9 that the force imparted by the dog cam 42 (43) against the associated driven cam 63 (64) is resolved into two components, one rotational and tending to drive the transverse pin 67 and anvil 48 against the resistance of the work; and the other axial and tending to shift the dog 33 forward against the resistance of spring 58. Now, the spring is under pre-compression so that under relatively light loads the axial or declutching component is insufficient to cause movement of the dog 33 relative to driven cam element 62. As the nut is rotated to its final set position, resistance to rotation increases, with a corresponding rise in the declutching component and with the result that the cam surfaces 42 and 43 move up on cam surfaces 63 and 64 respectively, thereby camming the dog 33 forwardly upon the spindle 36 and overcoming the resistance of spring 58. As the dog cam 42 (43) rides over the associated driven cam 63 (64) in a helical path, the spring 58 becomes further compressed, thus increasing its resistance to declutching movement. However, the rise in torque reaction, with its corresponding rise in declutching component is generally sufficient to cause the camming action, once it has started, to continue rapidly until the surface of driving cam 42 loses contact with the associated driven surface of cam 63. At this instant the dog 33 is released from its rotational load, while still being driven by the hammer and while still being urged rearward by spring 58. The dog continues its helical motion for a brief interval following cam separation and until stopped by engagement with the anvil teeth 69. Referring to Fig. 10, which shows the parts at the instant of commencement of the impact blow, the axial overthrow of the dog following cam disengagement, due to momentum of the dog and in spite of spring pressure is represented by the letter A, while the circumferential overrun due to the momentum of the dog 33, hammer 28, motor shaft 24 as well as the continued power supply to the motor, is represented by the letter C. Such momentum and power are expended in the delivery of an impact or hammer blow from jaws 40 to the anvil jaws 69. This blow is delivered across jaw faces which lie in planes parallel to the axis of the tool and the direction of the impact therefore is entirely rotational or tangential with no declutching component.

Following the delivery of an impact, the spring 58, at this time unopposed, starts to move the dog rearwardly. As the dog is moved out of engaged position with the anvil, the dog cams 42 and 43 engage the back slopes of cams 63 and 64 respectively, causing the cam element 62 to rotate backwards through the angle provided by the lost motion arrangement, thereby permitting the impact jaws 40 to completely disengage from the impact jaws 49 of the anvil. With the dog disengaged at both its front and rear faces the rotor assembly comprising dog 33, hammer 28, and rotor shaft 24 is released for rotation under the power of the motor through an angle of free motion of more than 300 degrees, thus accelerating and storing up kinetic energy particularly in the massive hammer which acts as a flywheel. At the end of the free motion period hammer cam 42 (43) re-engages driven cam 63 (64), delivering a glancing blow thereto as it takes up the lost motion between pin 67 and slot 66 and then being deflected by cam 62 for forward movement into the path of the anvil jaws 69 to deliver a powerful rotational impact. The rotational hammer blows are delivered in rapid succession with the dog, hammer and motor shaft coming to a complete stop at each impact, then pausing for the axial declutching of the dog, and then accelerating for a full 360 degrees of rotation. Declutching action does not take place during impact but starts when the pressure between the jaws is relieved sufficiently to permit the spring to act. During each impact the anvil is turned, of course, to tighten the driven nut, the amount of the movement and hence of the force of the blow being dependent upon the resistance to rotation. As the force of the blow becomes greater, the hammer jaw may rebound circumferentially from the anvil jaw. Under conditions of substantial rebound the cam elements 42 and 63 will contact each other at the crests or in extreme cases will contact upon the active slope. In either case, as the forward rotation of the hammer is resumed, the crests of the cams will pass each other and the back slopes will become effective.

The action of the cams 42 and 63 between impacts is similar to the action (above described) upon first release of the cams except that it takes place with the dog moving at a higher speed and over a shorter interval of time than previously. In either case, the cams while engaged serve the dual function of supplying a driving force to the anvil and an axial declutching force to the dog at the same time. The effect of the driving force is different, however, in the two cases. Prior to the first impact, the driving force on the cams permits the driven nut to be run down at the same high speed as the motor, with no lost motion due to declutching. Between impacts the rotational force of the cams serves the purpose of taking up any lost motion or looseness in the driving connection between anvil 48 and wrench socket 72, or between the socket and the driven nut, bolt or screw (not shown), which otherwise might attenuate the force of the rotary impact.

Referring to Fig. 12 it will be seen that each cam is of such short circumferential length (80°), in relation to the spaces between cams, that the hammer dog does not start to move until each individual hammer jaw 40 has passed beyond the non-mating anvil jaws 69 (Fig. 5) and is approaching the associated jaw which it is designed to strike. This arrangement obviates the danger of partial engagement between mis-mated jaws by delaying the start of the axial re-clutching movement of the dog until it has safely travelled a required circumferential distance.

Shocks to the operator are minimized for the following reasons: the square, or non-camming faces of the impact jaws do not create any axial component of force on delivery of a blow; the weight of the axially movable parts is reduced by arranging the dog to move back and forth independently of the heavy hammer 28; the reaction of the rebound is not transmitted to the housing but to the freely rotating motor shaft 24; and there are four jaws instead of the usual two, to distribute the force of blow.

Excessive wear on the impact clutch jaws is prevented because of the large number of jaws; also because the jaws do not declutch while under impact stress; and for the further reason that the cams guide the movable jaws into engagement over the full area of the jaws. Such guiding action is effective at all speeds of rotation and therefore permits the operator, by regulation of the air pressure in the supply to the motor, to control the force of the blow.

It is to be noted that the various working parts are angularly symmetrical, providing impacting torque in either direction of rotation. While the cams 42, 43 and 63, 64, have been shown for provision of impacting engagement once every 360° of hammer rotation, a cam arrangement following the teachings of the invention, could be easily arranged for provision of impacting engagement at other degrees of hammer rotation, such as at every 180°. Nor is it essential that the number of impacting jaws 40, 69, be of the number shown (i. e., four each), since other combinations of impacting jaws may be used if desired. In addition, the dog 33 may be substituted by a cam operated yoke which would be arranged to move a plurality of longitudinally slidable pins mounted in the hammer, to achieve a similar effect to the dog shown.

Accordingly, the invention is not to be limited to the specific embodiment of the invention illustrated and described, since such is merely for purposes of teaching a practical application of the invention, but rather it is to be understood as defined in the appended claims.

What is claimed is:

1. An impact clutch comprising in combination a rotatable hammer element, a dog member connected to the hammer element for axial movement with respect thereto and having a plurality of impact jaws, a rotatable anvil member adapted for connection with a driven member and having a plurality of impact jaws, cam means adapted to transmit rotary motion of the hammer element to the anvil member and, upon the development of a predetermined torque load upon the anvil member, to cam the dog member so that the impact jaws thereof will engage the impact jaws of the anvil member to deliver a rotary impact blow to the driven member, and means to constantly urge the dog member away from the anvil member.

2. An impact clutch comprising in combination a rotatable hammer element, a dog member slidably connected to the hammer element for axial movement with respect thereto and having one or more impact jaws, a rotatable anvil member adapted for connection with a driven member and having one or more impact jaws, cam means adapted to transmit rotary motion of the hammer element to the anvil member, and being responsive to the rotary motion of the hammer element upon development of a predetermined torque load upon the anvil member to cam the dog member into intermittent driving engagement with the anvil member by way of the respective impact jaws, and compression means to constantly urge the dog member away from the anvil member.

3. An impact clutch comprising in combination a rotatable hammer element, a dog member slidably connected to the hammer element for axial movement with respect thereto and having a plurality of impact jaws, a rotatable anvil member adapted for connection with a driven member and having a plurality of impact jaws, a spindle for the rotational support of the dog member, a cam element mounted upon the spindle for limited angular movement with respect thereto and adapted to transmit rotary motion of the dog member to the anvil member by way of the spindle, said cam element responsive to the rotary movement of the dog member upon development of a predetermined torque load upon the anvil member to cam the dog member into engagement with the anvil member by way of the respective impact jaws, and compression means to constantly urge the dog member away from the anvil member.

4. An impact clutch comprising in combination a rotatable hammer element, a dog member slidably connected to the hammer element for axial movement with respect thereto and having one or more impact jaws, a rotatable anvil member adapted for connection with a driven member and having one or more impact jaws, cam means adapted to transmit rotary motion of the dog member to the anvil member and being responsive to every complete rotary motion of the hammer element upon development of a predetermined torque load upon the anvil member for camming the dog member into impact engagement with the anvil member by way of the respective impact jaws to deliver an impact blow to the driven member, and compression means to disengage the dog member from the anvil member after each impact blow.

5. In an impact clutch, a dog member having a pair of circular cam projections each of which are of similar proportions but of different radii, and a cam element having a pair of circular cam projections of the same proportions and arranged in the same manner as the cam projections of the dog member and adapted for engagement with the latter, the circular cam projections of shorter radius when not in engagement being arranged to extend within the circular cam projections of larger radius.

6. An impact clutch comprising in combination a rotatable hammer, a dog arranged axially with respect the hammer and slidably connected thereto and having a plurality of jaws upon a forward face and a plurality of cam surfaces upon a rear face, a rotatable anvil adapted for connection with a driven member and having a plurality of jaws of the same number as provided upon the dog, a spindle for rotational support of the dog, said spindle being drivingly connected to the anvil and further including a compression spring arranged to exert a constant force upon the dog to urge the latter away from the anvil, and a cam element mounted upon the spindle and including a lost motion arrangement to allow the cam element to rotate a given amount upon the spindle, said cam element having a plurality of cam surfaces adapted to engage the cam surfaces of the dog whereby the anvil is rotated prior to imposition of a predetermined torque load on the driven member, and further adapted to move the dog so that the jaws thereof will be impactingly engaged with the jaws of the anvil when a predetermined torque load is imposed upon the driven member.

7. An impact clutch comprising a rotatable hammer assembly having one or more driving jaws, a rotatable anvil having driven jaws, a yieldable means constantly urging the jaws apart toward declutched relation, and positive means in opposition to the yieldable means for moving the jaws into engagement, said positive means comprising one or more driving cams carried by the hammer assembly and engageable with one or more driven cams carried by the anvil.

8. An impact clutch according to claim 7 in which the driven cam has a lost motion connection with the anvil.

9. An impact clutch comprising a rotatable hammer assembly including a dog having driving jaws, a rotatable anvil having driven jaws, and means for successively engaging and releasing the driving jaws from the driven jaws to cause the hammer assembly to deliver a series of rotative impacts to the anvil, said means connecting the hammer assembly to the anvil independently of the jaws for delivering torque to the anvil when the jaws are out of engagement.

10. An impact clutch according to claim 9 in which the torque delivery means comprises one or more driving cams rotatable with the hammer assembly and one or more driven cams, the driven cam or cams being movable with respect to the anvil through a limited degree of lost motion, and adapted thereafter to rotate in unison with the anvil while being driven by the hammer cam or cams.

11. An impact clutch comprising a rotatable hammer having one or more driving jaws, a rotatable anvil having one or more driven jaws, said driving jaw or jaws being successively engageable and releasable with respect to the driven jaw or jaws to cause the hammer to deliver a series of impacts to the anvil, cooperating cams carried by the hammer and anvil respectively for establishing a driving connection between the hammer and anvil while the impact jaws are out of engagement, a spring holding the cams in engagement and arranged to cause the hammer to drive the anvil continuously under relatively light loads, said spring being yieldable upon attainment of a predetermined torque to permit relative movement between the cams.

12. An impact clutch according to claim 11 in which the spring urges the impact jaws apart and is overcome by the cams.

13. An impact clutch comprising a rotatable anvil having one or more impact receiving jaws, a rotatable hammer assembly including a hammer element of substantial mass and a dog carried by the hammer element in unison therewith, said dog being mounted for independent movement relative to the hammer element toward and away from the anvil, one or more impact delivering jaws on said dog movable into and out of the annular path of rotation of said anvil jaws, resilient means for moving the dog in a declutching direction away from the anvil, and reclutching means for positively moving the dog toward the anvil in opposition to the resilient means to deliver a rotational impact, characterized in that said reclutching means comprises a cam or cams carried with the hammer assembly and engaging a cam or cams carried with the anvil.

14. An impact clutch comprising a shaft adapted to be driven by a motor, a hammer element having a rigid driving connection with said shaft, a dog mounted on said hammer element for movement in a forward and rearward direction relative thereto and having one or more impact delivering jaws, an anvil coaxially rotatable with the hammer element and having one or more impact receiving jaws positioned to be engaged with the jaw or jaws on the dog when the latter is in its forward position, the dog having a rigid driving connection with the hammer element whereby motion of the dog, hammer element and shaft relative to the anvil is arrested upon delivery of an impact to the anvil, resilient means constantly urging the dog rearward toward a declutching position, and positive means for moving the dog forward into re-engagement with the anvil, said positive means including a cam element carried with the anvil.

15. An impact clutch comprising a rotatable anvil having an impact jaw, a coaxially rotatable hammer assembly including a dog having an impact jaw, said jaws being relatively movable into and out of engagement to deliver a succession of rotational impacts, jaw engaging means comprising a cam carried by the hammer assembly engageable with a cam carried by the anvil, and jaw disengaging means comprising a spring tending to separate the dog from the anvil at all times.

16. An impact clutch comprising a rotatable anvil having a plurality of impact receiving jaws, a hammer element coaxially rotatable with respect to the anvil, a dog carried by the hammer and guided thereon for longitudinal movement toward and from the anvil, said dog having a plurality of impact jaws movable into and out of the annular path of the anvil jaws to deliver a rotational impact thereto, resilient automatic means for moving the dog away from the anvil automatically upon termination of an impact and for maintaining the dog jaws out of the path of the anvil jaws as they pass by one or more jaws on the anvil, and means for positively moving the dog toward the anvil into re-engaging position after each jaw on the dog has passed by a predetermined number of anvil jaws, said positive means overcoming the resilient means.

17. An impact clutch comprising a rotatable hammer dog member and a rotatable anvil member, means for driving said hammer dog member, successively disengageable and re-engageable impact jaws on said members, automatic means for causing disengagement of said impact jaws, and means for automatically effecting re-engagement of said jaws, said re-engaging means comprising a pair of cooperating cam elements carried along with the hammer dog member and anvil member respectively, characterized in that one of said cam elements has a lost motion connection with respect to its associated member.

18. An impact clutch comprising an anvil having a plurality of impact receiving jaws by which it is driven, a rotatable hammer element having mounted thereon for relative movement a plurality of impact jaws, each hammer jaw being arranged to engage an associated anvil jaw to deliver a rotational impact thereto, automatic means for separating the jaws following an impact and for maintaining the jaws in separated condition while the hammer element accelerates and while each hammer jaw passes by the non-mating jaw or jaws on the anvil, and means for positively moving the jaws into re-engaging position as each hammer jaw approaches its associated anvil jaw, the re-engaging means comprising cooperating cams carried with the hammer element and anvil respectively.

References Cited in the file of this patent
UNITED STATES PATENTS

| | | |
|---|---|---|
| 1,913,046 | Callan | June 6, 1933 |
| 2,179,724 | Kuehne | Nov. 14, 1939 |
| 2,563,711 | Fitch | Aug. 7, 1951 |

UNITED STATES PATENT OFFICE

CERTIFICATE OF CORRECTION

Patent No. 2,825,436                                                         March 4, 1958

Lester A. Amtsberg

It is hereby certified that error appears in the printed specification of the above numbered patent requiring correction and that the said Letters Patent should read as corrected below.

Column 6, line 42, for "jaws." read -- jaws, --; column 7, line 44, for "having driven jaws, a yieldable means constantly" read -- having one or more driven jaws, yieldable means --; column 8, line 62, strike out "automatic".

Signed and sealed this 19th day of August 1958.

(SEAL)
Attest:

KARL H. AXLINE                                                ROBERT C. WATSON
Attesting Officer                                         Commissioner of Patents